United States Patent
Miranzo et al.

(10) Patent No.: US 9,988,313 B2
(45) Date of Patent: Jun. 5, 2018

(54) PROCESS FOR PRODUCTION OF GRAPHENE/SILICON CARBIDE CERAMIC COMPOSITES

(71) Applicants: The Penn State Research Foundation, University Park, PA (US); Consejo Superior De Investigaciones Cientificas (CSIC), Madrid (ES)

(72) Inventors: Pilar Miranzo, Madrid (ES); Carmen Ocal, Molins de Rei (ES); Maria Isabel Osendi, Madrid (ES); Manuel Belmonte, Madrid (ES); Cristina Ramirez, Madrid (ES); Benito Roman-Manso, Zamora (ES); Humberto R. Gutierrez, Louisville, KY (US); Mauricio Terrones, State College, PA (US)

(73) Assignee: The Penn State Research Foundation, State College, PA (US)

( * ) Notice: Subject to any disclaimer, the term of this patent is extended or adjusted under 35 U.S.C. 154(b) by 398 days.

(21) Appl. No.: 14/429,546

(22) PCT Filed: Sep. 19, 2013

(86) PCT No.: PCT/US2013/060614
§ 371 (c)(1),
(2) Date: Mar. 19, 2015

(87) PCT Pub. No.: WO2014/047283
PCT Pub. Date: Mar. 27, 2014

(65) Prior Publication Data
US 2015/0246851 A1    Sep. 3, 2015

Related U.S. Application Data

(60) Provisional application No. 61/703,495, filed on Sep. 20, 2012.

(51) Int. Cl.
*H01B 1/04* (2006.01)
*C04B 35/00* (2006.01)
(Continued)

(52) U.S. Cl.
CPC ............ *C04B 35/573* (2013.01); *B82Y 30/00* (2013.01); *C04B 35/575* (2013.01);
(Continued)

(58) Field of Classification Search
CPC .... H01B 1/00; H01B 1/04; H01B 1/24; C04B 25/56; C04B 25/573–25/577; C04B 25/64; C04B 25/645; B82B 3/00
See application file for complete search history.

(56) References Cited

U.S. PATENT DOCUMENTS

2007/0212538 A1    9/2007   Niu
2011/0177322 A1    7/2011   Ogrin et al.
(Continued)

FOREIGN PATENT DOCUMENTS

WO    2010123902 A1    10/2010
WO    2011086382 A1    7/2011

OTHER PUBLICATIONS

Munir et al "Electric current activation of sintering: A review of the pilsed elecgric current sintering process", Journal of the American Ceramic Society, 94(1) 1-19 (2011).*

(Continued)

*Primary Examiner* — Mark Kopec
(74) *Attorney, Agent, or Firm* — Buchanan Ingersoll & Rooney PC

(57) ABSTRACT

We provide a method for the in situ development of graphene containing silicon carbide (SiC) matrix ceramic composites, and more particularly to the in situ graphene growth within the bulk ceramic through a single-step approach during SiC ceramics densification using an electric current (Continued)

activated/assisted sintering (ECAS) technique. This approach allows processing dense, robust, highly electrical conducting and well dispersed nanocomposites having a percolated graphene network, eliminating the handling of potentially hazardous nanostructures. Graphene/SiC components could be used in technological applications under strong demanding conditions where good electrical, thermal, mechanical and/or tribological properties are required, such as micro and nanoelectromechanical systems (MEMS and NEMS), sensors, actuators, heat exchangers, breaks, components for engines, armors, cutting tools, microturbines or microrotors.

14 Claims, 5 Drawing Sheets

(51) Int. Cl.
*C04B 35/573* (2006.01)
*B82Y 30/00* (2011.01)
*C04B 35/575* (2006.01)
*C04B 35/626* (2006.01)
*C04B 35/645* (2006.01)
*C04B 35/64* (2006.01)
*H01B 1/18* (2006.01)

(52) U.S. Cl.
CPC ......... *C04B 35/6261* (2013.01); *C04B 35/64* (2013.01); *C04B 35/645* (2013.01); *H01B 1/04* (2013.01); *H01B 1/18* (2013.01); *C04B 2235/3217* (2013.01); *C04B 2235/3224* (2013.01); *C04B 2235/3225* (2013.01); *C04B 2235/3227* (2013.01); *C04B 2235/3418* (2013.01); *C04B 2235/383* (2013.01); *C04B 2235/3834* (2013.01); *C04B 2235/422* (2013.01); *C04B 2235/425* (2013.01); *C04B 2235/443* (2013.01); *C04B 2235/5436* (2013.01); *C04B 2235/5454* (2013.01); *C04B 2235/6567* (2013.01); *C04B 2235/6581* (2013.01); *C04B 2235/666* (2013.01); *C04B 2235/78* (2013.01)

(56) References Cited

U.S. PATENT DOCUMENTS

| | | | | |
|---|---|---|---|---|
| 2011/0223094 | A1* | 9/2011 | Lanzara | B82Y 30/00 423/447.2 |
| 2015/0275378 | A1* | 10/2015 | Koo | C25B 1/00 205/615 |

OTHER PUBLICATIONS

Wang, L. et al., Mass Production of Graphene via an in Situ Self-Generating Template Route and its Promoted Activity as Electrocatalytic Support for Methanol Electroxidization, J. Phys. Chem., 2010, p. 8727-8733, vol. 114, No. 19, American Chemical Society.
Zhu, K. et al., Graphene Covered SiC Powder as Advanced Photocatalytic Material, Applied Physics Letters, 2012, p. 23113.1-23113.4, vol. 100 No. 2, American Institute of Physics.
Miranzo, P. et al., In Situ Processing of Electrically Conducting Graphene/SiC Nanocomposites, Journal of the European Ceramic Society, 2013, p. 1665-1674, vol. 33, No. 10, Elsevier, Ltd.
Extended European Search Report for European Patent Application No. 13839518.1 dated Apr. 29, 2016.
Khimicheskaya tekhologiya keramiki pod red. prof. I. Ya. Guzmana. Moskva, OOO RIF "Stroimaterialy", 2003, p. 435, 436, (No English language translation provided).
International Search Report and Written Opinion dated Jan. 16, 2014 for PCT/2013/060614, filed Sep. 19, 2013.

\* cited by examiner

FIG. 2(A)
FIG. 2(B)
FIG. 2(C)
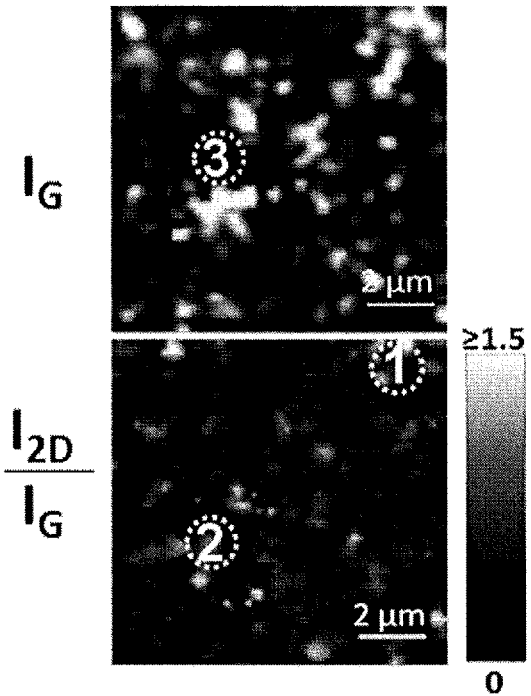
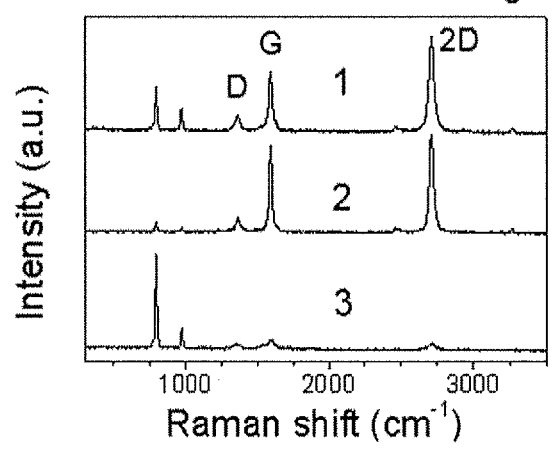

PROCESS FOR PRODUCTION OF GRAPHENE/SILICON CARBIDE CERAMIC COMPOSITES

CROSS-REFERENCE TO RELATED APPLICATIONS

This application is the national phase under 35 U.S.C. § 371 of PCT International Application No. PCT/US2013/060614, filed on Sep. 19, 2013, which claims priority to U.S. Provisional Patent App. No. 61/703,495, filed on Sep. 20, 2012, and which is incorporated by reference herein.

GOVERNMENT SPONSORSHIP

This invention was made with research supported by the Spanish Government under the projects MAT2009-09600 and MAT2012-32944, and by the the Spanish National Research Council (CSIC) project I-LINK0119.

BACKGROUND OF THE INVENTION

Field of the Invention

Embodiments relate to the in situ manufacturing of graphene-containing silicon carbide (SiC) ceramic composites.

Background of the Related Art

Graphene, a $sp^2$ hybridized carbon sheet, possesses outstanding electronic and physico-chemical properties, and it is considered one of the strongest materials ever produced. Graphene sheets have been proposed for use as an ideal filler in the fabrication of robust polymer and ceramic composites. Graphene is commonly synthesized by chemical exfoliation of graphite-like materials. Some exfoliation methods are based on the intercalation of oxide species between the graphene layers of graphite. These result in graphene oxide monolayers (GO).

GO's subsequent reduction to graphene (rGO) can be achieved chemically or thermally. The main disadvantage of this method is the poor mechanical and conducting properties of rGO as compared to pristine mechanically exfoliated graphene. Alternative routes have also been explored for producing highly crystalline graphene, mainly used for the fabrication of electronic devices. These are the chemical vapour deposition (CVD) of hydrocarbons on metallic surfaces or the thermal decomposition of SiC that leads to the epitaxial growth of graphene (EG). Epitaxial growth typically occurs on 6H—SiC (0001) crystals after ultrahigh vacuum annealing at ~1200° C. or at higher temperatures (>1500° C.) under a quasi atmospheric pressure of argon.

Yannopoulos, et al., have recently reported the fast generation of large-area and homogenous EG on SiC substrates using a $CO_2$ laser as heating source. This method does not require high vacuum and operates at low temperatures with fast heating and cooling rates. Homogeneous graphene layers have also been epitaxially grown on SiC substrates by direct deposition of carbon.

SiC ceramics exhibit excellent thermal and high temperature mechanical properties suitable for a wide range of structural applications. The addition of graphene as filler further enhances those properties, including outstanding tribological and electrical performance. In this context, preliminary data on graphene/ceramic nanocomposites demonstrated outstanding improvements in the mechanical and electrical properties of alumina and silicon nitride by the introduction of graphene nanoplatelets (GNPs), reaching even better results than those obtained using carbon nanotubes.

The production of bulk graphene/ceramic nanocomposites is mainly done by mixing dispersions of graphene nanosheets or GNPs and ceramic powders in convenient solvents and subsequent densification at high temperatures. One challenge to the fabrication of homogenous graphene/SiC ceramic composites using this method is the dispersion of graphene into the ceramic matrix. An unsuccessful dispersion will lead to the formation of graphene agglomerates and defects in the composite. This causes a decrease in many beneficial properties of the material.

Another important problem is the manufacturing cost to produce large batches of monolayer or few layers graphene (FLG) needed to fill the ceramic matrix with contents up to 50% in weight. For instance, 100 mL of graphene oxide aqueous solution with 80% of carbon content can cost up to $740.00 in the current market.

A further challenge is the densification of the graphene/SiC powder compacts. SiC ceramics containing sintering additives require very high sintering temperatures for their densification (1600-2000° C.). This can lead to the graphene degradation, causing a deleterious effect on the properties of the material.

In summary, the manufacturing of bulk graphene/ceramic composites can present problems linked to graphene agglomeration, uncompleted composite densification or graphene degradation, especially for SiC-based materials where very high sintering temperatures are required. All these facts affect the properties of the composite.

BRIEF SUMMARY OF THE INVENTION

We provide methods for manufacturing in situ homogenous graphene/SiC ceramic composites in a single-step using a ceramic powder composition as composite precursor and electric current activated/assisted sintering (ECAS) as both densification and graphene growth technique. A typical method comprises the processing of a ceramic powder composition containing SiC and sintering additive powders, as well as the simultaneous graphene growth and sintering of the composite by as ECAS technique under vacuum atmosphere at high temperatures and fast heating and cooling rates. Typically the ECAS technique is conducted at 100° C./min. In some embodiments it is conducted above 150° C./min. A typical vacuum atmosphere has a pressure of 0.1 to 10 Pa; in some embodiments it is between 0.1 to 1 Pa, between 1-5 Pa or between 8-10 Pa. High temperatures are typically temperatures above 1300° C., though in some embodiments they are above 1350° C., above 1400° C., above 1450° C., or above 1500° C.

This method includes in situ homogenous graphene growth within a ceramic matrix in a single-step from the thermal decomposition of SiC during the sintering process. This avoids the addition of graphene to the ceramic powder composition, reducing the complexity, the costs (since graphene is not a precursor and its production cost is eliminated from the equation), and the time of the fabrication process. This may also prevent the problems associated with the dispersion of the graphene within the matrix.

Although doing so is not required unless stated in the claims, methods as reported herein may enhance the interfacial strength between the graphene and the SiC grains, and may reduce the amount of graphene necessary to create an interconnected network. This improves the thermal and electrical properties of the composition. In addition, embodiments relate to the in situ growing of graphene having different numbers of layers, from monolayer to GNPs. Embodiments may also relate to the sintering of SiC based nanocomposites using an ECAS technique, leading to dense composite materials without graphene degradation.

BRIEF DESCRIPTION OF THE DRAWINGS

FIG. 2(A) and FIG. 2(B), respectively, show Micro-Raman G and 2D/G maps, and FIG. 2(C) shows Raman spectra at specific positions within the maps of α-SiC materials sintered by SPS at 1800° C. for 5 min, in 4 Pa vacuum, and applying a uniaxial pressure of 50 MPa.

DETAILED DESCRIPTION OF THE INVENTION

Figure 1A:
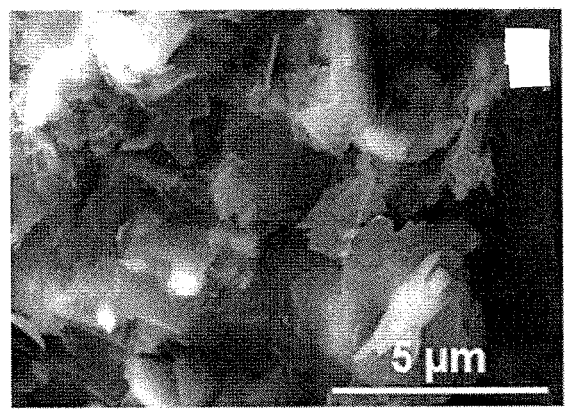
FIG. 1(A) shows a field emission scanning electron micrograph of a fracture surface view and FIG. 1(B) shows transmission electron micrograph corresponding to α-SiC materials sintered by SPS at 1800° C. for 5 min, in 4 Pa vacuum, and applying a uniaxial pressure of 50 MPa. 1L, 2L, 3L and 5L inidicate the number of graphene layers.

Embodiments are directed to methods for manufacturing in situ graphene containing silicon carbide matrix ceramic composites. This is accomplished by growing graphene within a bulk material during a densification process of the ceramics using an electric current activated/assisted sintering technique. This method provides a single-step approach for processing dense, robust, highly electrical conducting and well-dispersed SiC composites containing a percolated graphene network.

In some instances the electrical conductivity of products of the invention may be as high as 935 $S \cdot m^{-1}$, which is ten orders of magnitude higher than the electrical conductivity of graphene free SiC ceramics. For example, electrical conductivity may be between 900 and 935 $S \cdot m^{-1}$. Those skilled in the art may, with the benefit of this disclosure, create products having an even greater electrical conductivity. Of course, embodiments of the invention are also not required to have an electrical conductivity that is that significant. Products of embodiments of the invention may have a physical strength of between 300-1000 MPa, though such a physical strength is not necessarily required of an embodiment unless so stated in the claims.

Graphene possesses outstanding electronic and physico-chemical properties, and it is considered one of the strongest materials ever produced. The development of bulk graphene/ceramic composites is typically carried out by mixing dispersions of graphene nanosheets or GNPs and ceramic powders in convenient solvents using mechanical procedures (sonication, mechanical stirring, etc.), and subsequent densification at high temperatures. However, this method can lead to an insufficient dispersion of the graphene within the ceramic matrix and, therefore, to graphene agglomerates and defect formation in the composite. This is detrimental to the properties of the material. Graphene degradation during the sintering process at high temperatures could also take place.

Embodiments simplify the manufacturing process of graphene/ceramic composites, and reduce the overall costs and manufacturing time by eliminating the need for graphene production prior to sintering. Embodiments may ameliorate problems associated with dispersion of the graphene within the matrix. They may enhance the interfacial strength between the graphene and the SiC grains. They may reduce the amount of graphene to create an interconnected network within the material. Embodiments may preclude the handling of potentially hazardous carbon nanostructures. They may remove the conventional procedure based on colloidal processing of graphene/ceramic mixtures.

The SiC matrix typically used in the present invention includes SiC powders plus optional sintering additives. Herein, SiC powders comprise alpha-phase or beta-phase SiC, or combinations thereof. Mean particle size for the SiC powder precursors is typically between 0.05 μm to 10.0 μm. Preferred embodiments would have a mean particle size in a range between 0.05-2 μm, which would lead to improved strength and densification of the product. Other embodiments may have a mean particle size between 0.05-0.1 μm. Although any particle size can be used in the scope of the present invention, larger particle sizes are more difficult to sinter.

Sintering additives are commonly added to promote the densification of the SiC and comprise mixtures of metal oxides or mixtures of metal oxides and non-oxides. In the present invention a mixture of aluminium oxide and yttrium oxide was preferably employed. The ratio of aluminium oxide to yttrium oxide may range from about 1 to 9 parts and about 2 to 12, respectively, by weight. Other sintering additives may be based on aluminum nitrate, yttrium nitrate, or other rare earth oxides. For example, lutetium oxide, ytterbium oxide, gadolinium oxide or lanthanum oxide may also be used.

Graphene, according to the present invention, may take many forms. For example, it may be monolayer (FIG. 1(B), at 1L), few layers (FIG. 1(B) at 2L, 3L 5L) and multilayer graphene (FIG. 1(A)), or combinations of thereof.

Embodiments include the sintering of SiC based composites using an ECAS technique, leading to dense composite materials without graphene degradation. ECAS includes, for example any of the following techniques: resistance sintering (RS), electric discharge sintering (EDS), spark plasma sintering (SPS), field activated sintering technique (FAST), pulsed electric current sintering (PECS), pulse discharge sintering (PDS), plasma activated sintering (PAS), and pulse current sintering (PCS).

Regarding the sintering process by ECAS technique, in one embodiment one or more of the following conditions vacuum atmosphere between 0.1 and 10 Pa, uniaxial pressure between 20 and 100 MPa, and maximum temperatures (Tmax) between 1600° C. and 2000° C. were used. A typical vacuum atmosphere has a pressure of 0.1 to 10 Pa; in some embodiments it is between 0.1 to 1 Pa, between 1-5 Pa or between 8-10 Pa. High temperatures are typically temperatures above 1300° C., though in some embodiments they are above 1350° C., above 1400° C., above 1450° C., or above 1500° C.

Heating rate ramp-up until Tmax was designed as follows: a) 133° $C \cdot min^{-1}$ up to 1400° C.; b) from 1400° C. to Tmax−75° C. at 75° C.·min⁻¹; c) from Tmax−75° C. to Tmax−25° C. at 50° C.·min⁻¹; d) from Tmax−25° C. to Tmax at 25° C.·min⁻¹. The holding time at the maximum temperature was between 0 and 30 minutes.

Figure 1B:
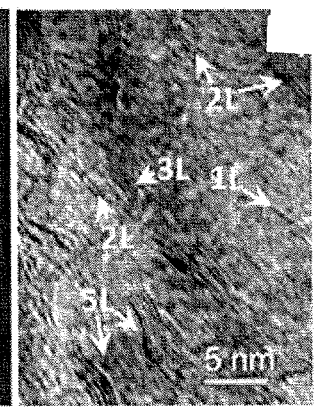

Raman spectroscopy (FIG. 2(A)-2(C) and FIG. 4(A)-FIG. 4(A)-4(C)), and FESEM (FIG. 1(A) and HRTEM (FIG. 1(B)) observations of an examplary embodiment confirmed the extensive graphene growth within the SiC matrix. In this embodiment, the densification process was carried out by SPS under vacuum atmosphere. SPS is an electric current activated sintering process that consists of applying a pressure and a pulsed direct current to a powdered sample placed into a graphite die, thus enabling very fast sintering rates 100° C. min⁻¹) and short densification times.

Although not wishing to be bound by theory, the inventors propose that the in-situ epitaxial graphene (EG) growth within SiC is caused by the electric current flowing, the sintering temperature and the vacuum atmosphere. A possible explanation for formation of this EG is that during sintering, very local and abrupt conditions associated with the pulsed current percolation path during the SPS process take place. In fact, increased electric strength on the interface of contacting particles of up to 40 times the applied field has been modeled for the SPS. Regions that intercept the percolation path will locally exhibit high temperatures and will consequently form highly crystalline graphene domains by decomposition of the SiOC/silica coating covering the SiC particles. Sublimation of SiO under the vacuum and high temperature conditions, presumably leaves a carbonaceous residue and exposes the underneath SiC layers for further thermal decomposition. This decomposition is favored by the low pressure (4 Pa), the high temperatures and clearly by the enhanced local field at the particle interfaces.

Conductive scanning force microscopy measurements confirmed the presence of conductive paths within the composite. This is due to the formation of a percolated graphene network. I-V curves (FIG. 3(B) and FIG. 3(C)) show a clear n-type rectifying behavior associated to the SiC phase (Δ) and the highly linear conducting graphene covered regions (○).

EXAMPLES

The following examples are provided by way of illustration only and not by way of limitation. A variety of parameters can be changed or modified to yield similar results. With the advantage of this disclosure many modifications would be apparent to one skilled in the art.

Example 1—Graphene/SiC Composite Obtained from α-SiC Powders Sintered by SPS at 1800° C.

α-Silicon carbide powders (S-2022, CERAC, polytype 6H) with a mean particle size of 0.78 μm are used as starting material. Aluminium oxide (SM8, Baikowski Chimie, France) and yttrium oxide (Grade C, H. C. Starck GmbH & Co., Germany) with a mean particle size of 0.3 μm and 0.9 μm, respectively, and purities equal to or higher than 95%, are employed as sintering additives. 3680 mg of silicon carbide, 80 mg of aluminium oxide (2 wt %) and 200 mg of yttrium oxide (5 wt %) are attrition milled for 2 h in 150 ml of ethanol containing 70 g of silicon nitride balls to avoid contamination. The ethanol of dispersed slurry is removed using a rotary-evaporator at 90° C. for 2 h, and the ceramic paste is dried in an oven at 120° C. for 6 h. The dried paste is sieved through a 63 μm mesh.

A 20 mm graphite die is filled with 3 g of the ceramic powder mixture and placed in the spark plasma sintering equipment (Dr Sinter®, SPS-510CE, Japan). The sintering test is carried out at 1800° C. for 5 min, in 4 Pa vacuum, and applying a uniaxial pressure of 50 MPa. Heating rate is 133° C.·min⁻¹ up to 1400° C., 100° C.·min⁻¹ from 1400° C. to 1500° C., 90° C.·min⁻¹ from 1500° C. to 1680° C., 45° C.·min⁻¹ from 1680° C. to 1770° C., 30° C.·min⁻¹ from 1770° C. to 1800° C. Pulsed direct current of about 4.5 volts and about 2500 amperes are used.

The presence of graphene in dense specimens was verified by micro-Raman spectroscopy (Alpha300 WITec GmbH, Germany) using the 532 nm laser wavelength excitation, and an acquisition up to 3000 cm⁻¹.

The microstructure of the specimens was observed in the scanning electron microscope (FESEM, S-4700, Hitachi, Japan) on fracture surfaces. Transmission electron microscopy, TEM, analysis was performed in a JEOL EM-2010F (MA, USA) equipment with a field-emission source and accelerating potential at 200 kV.

Scanning force microscopy (SFM) measurements were performed under low humidity conditions (2% RH, obtained by a continuous N₂ gas flux) using a commercial head and software from Nanotec. Boron-doped diamond coated Si probes were used for both morphological and conductive SFM measurements.

FESEM (FIG. 1(A)) and TEM (FIG. 1(B)) micrographs show the presence of few- and multi-layer graphene with different sizes and stacking thicknesses within the ceramic matrix. Parallel lines with dark contrast in FIG. 1(B) resemble the cross-sections of few-layers graphene (1L, 2L, 3L and 5L). In fact the measured spacing between these lines ranges between 3.5-3.8 Å, which is in agreement with the value obtained experimentally for the spacing between graphene layers in graphite. This is a novel result and in fact supports our claim of producing a graphene/ceramic composite in one step without using graphene as a precursor.

Micro-Raman spectra (FIG. 2) at position 3 show intense peaks centered at 788 and 969 cm⁻¹ that correspond to hexagonal α-SiC polytypes (darkest areas in G map). At position 1 and 2, new peaks at 1360, 1597 and 2717 cm⁻¹ are clearly observed, which are ascribed to the disorder-induced D-, G- and 2D-bands of carbonaceous species. The intensity ratio between D/G (0.5) and 2D/G (1.7) bands confirms the existence in the bright spots of the maps of graphene, which is well distributed within the SiC matrix.

Figure 3A:
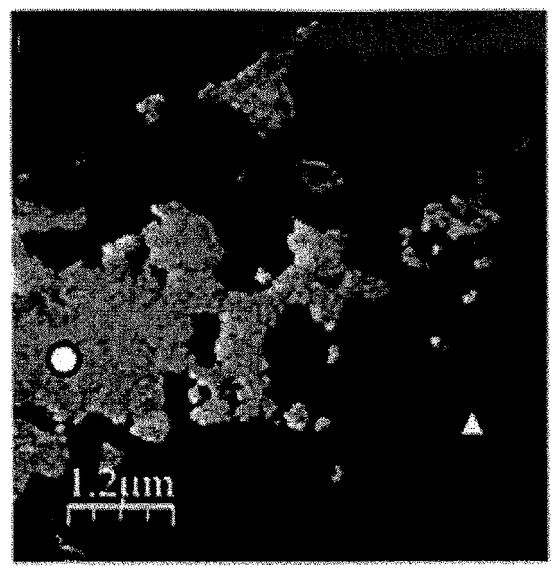
FIG. 3(A) shows conductive scanning force microscopy current map at Vtip=1.7V of α-SiC material sintered by SPS at 1800° C. for 5 min, in 4 Pa vacuum, and applying a uniaxial pressure of 50 MPa.
Figure 3B:
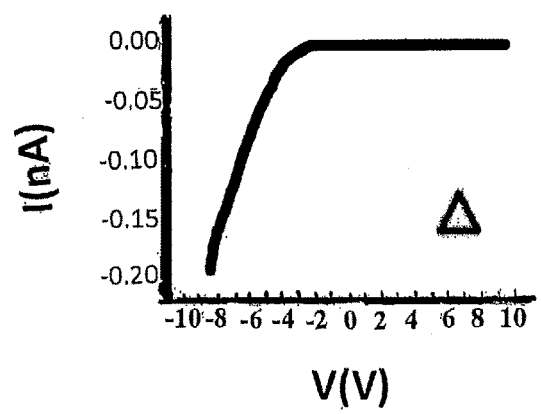
FIG. 3(B) and FIG. 3(C) show I-V curves at the primary phase SiC phase showing a clear n-type rectifying behaviour (○) in FIG. 3(C) and the highly linear conducting graphene covered regions (Δ) in FIG. 3(B).
Figure 3C:
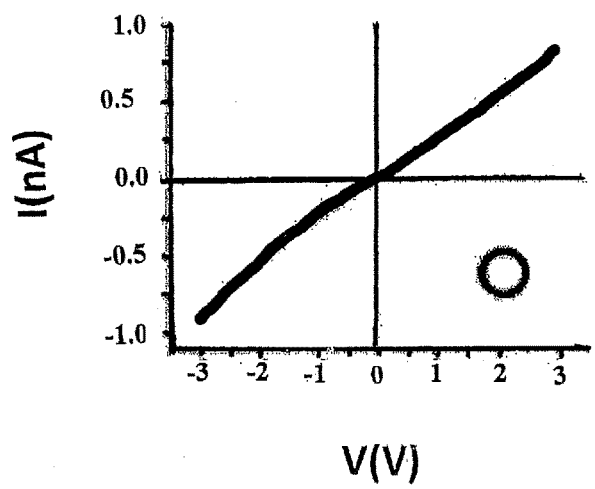

Conductive scanning force microscopy measurements (FIG. 3(A)) confirmed the presence of conductive path within the composite due to the formation of a percolated graphene network. I-V curves in FIG. 3(B) and FIG. 3(C) show a clear n-type rectifying behavior associated to the SiC phase (Δ) and the highly linear conducting graphene covered regions (○).

Example 2—Graphene/SiC Composite Obtained from β-SiC Powders Sintered by SPS at 1800° C.

β-Silicon carbide powders (BF-17A, HC-Starck, polytype 3C) with a mean particle size of 1.21 μm are used as starting material. Aluminium oxide (SM8, Baikowski Chimie, France) and yttrium oxide (Grade C, H. C. Starck GmbH & Co., Germany) with a mean particle size of 0.3 μm and 0.9 μm, respectively, and purities equal to or higher than 95%, respectively, are employed as sintering additives. 3680 mg of silicon carbide, 80 mg of aluminium oxide (2 wt %) and 200 mg of yttrium oxide (5 wt %) are attrition milled for 2 h in 150 ml of ethanol containing 70 g of silicon nitride balls to avoid contamination. The ethanol of dispersed slurry is removed using a rotary-evaporator at 90° C. for 2 h, and the ceramic paste is dried in an oven at 120° C. for 6 h. The dried paste is sieved through a 63 µm mesh.

A 20 mm graphite die is filled with 3 g of the ceramic powder mixture and placed in the spark plasma sintering equipment (Dr Sinter®, SPS-510CE, Japan). The sintering test is carried out at 1800° C. for 5 min, in 4 Pa vacuum, and applying a uniaxial pressure of 50 MPa. Heating rate is 133° C.·min$^{-1}$ up to 1400° C., 100° C.·min$^{-1}$ from 1400° C. to 1500° C., 90° C.·min$^{-1}$ from 1500° C. to 1680° C., 45° C.·min$^{-1}$ from 1680° C. to 1770° C., 30° C.·min$^{-1}$ from 1770° C. to 1800° C. Pulsed direct current of about 4.5 volts and about 2500 amperes are used.

The presence of graphene in dense specimens was verified by micro-Raman spectroscopy (Alpha300 WITec GmbH, Germany) using the 532 nm laser wavelength excitation, and an acquisition up to 3000 cm$^{-1}$.

The microstructure of the specimens was observed in the scanning electron microscope (FESEM, S-4700, Hitachi, Japan) on fracture surfaces.

Figure 4A:
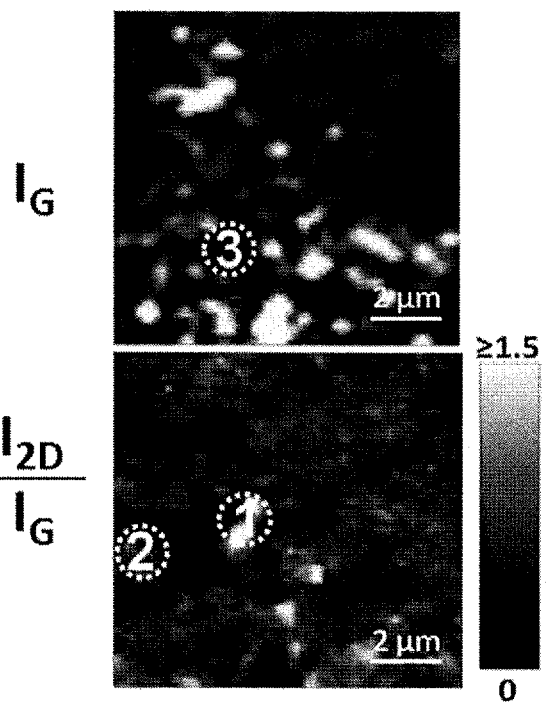
FIG. 4(A) and FIG. 4(B) show, respectively, micro-Raman G and 2D/G maps.
Figure 4B:
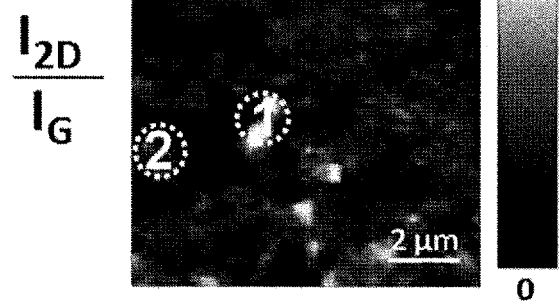
Figure 4C:
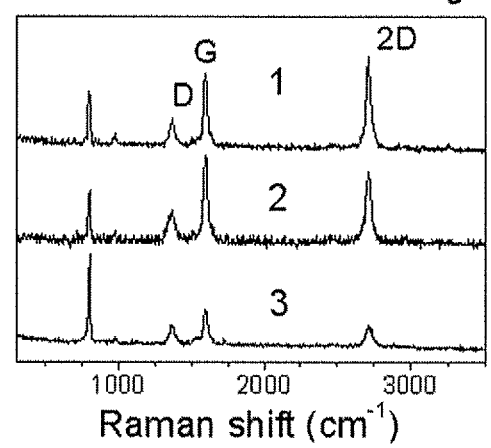
FIG. 4(C) shows Ramam spectra at specific positions within the maps of β-SiC materials sintered by SPS at 1800° C. for 5 min, in 4 Pa vacuum, and applying a uniaxial pressure of 50 MPa.

Micro-Raman spectra (FIG. 4(A)-FIG. 4(C)) show intense peaks centered at 796 cm$^{-1}$, that correspond to cubic β-SiC polytype, and peaks at 1360, 1597 and 2717 cm$^{-1}$ that are ascribed to the disorder-induced D-, G- and 2D-bands of carbonaceous species. The intensity ratio between D/G (0.5) and 2D/G (1.6) bands confirms the existence in the bright spots of the maps of graphene, which is well distributed within the SiC matrix.

Figure 5:
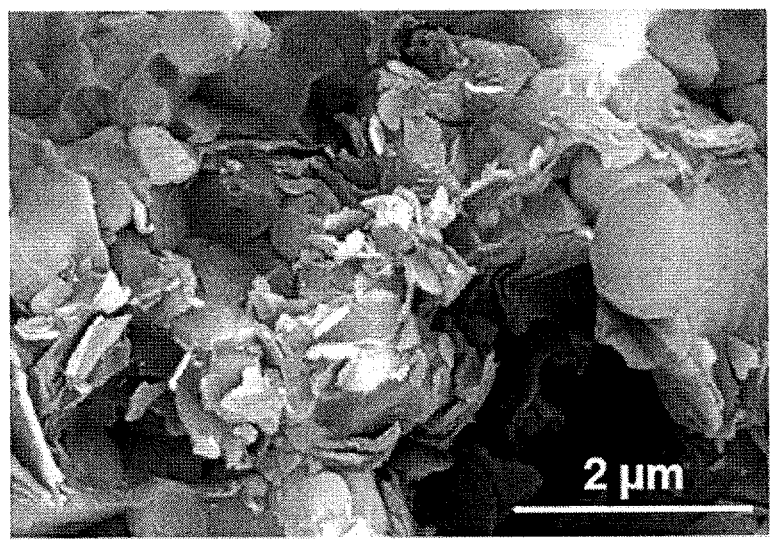
FIG. 5 shows field emission scanning electron micrographs of a fracture surface view corresponding to β-SiC material sintered by SPS at 1800° C. for 5 min, in 4 Pa vacuum, and applying a uniaxial pressure of 50 MPa.

FESEM (FIG. 5) micrograph shows the presence of few- and multi-layer graphene with different sizes and stacking thicknesses within the ceramic matrix.

Fracture toughness ($K_{IC}$) is measured using an instrumented microindenter (Zwick/Roell, Zhu 2.5). Vickers pyramid indenters are used at 49 N, and at least five well-defined indentations are performed per specimen. $K_{IC}$ average value of 4.5±0.3 MPa·m$^{1/2}$ is calculated.

Example 3—Graphene/SiC Composite Obtained from Nano-β-SiC Powders Sintered by SPS at 1850° C.

Nano-β-Silicon carbide powders (NanoArmor™, Nano-Armor, polytype 3C) with a mean particle size of 45-55 nm are used as starting material. Aluminium oxide (SM8, Baikowski Chimie, France) and yttrium oxide (Grade C, H. C. Starck GmbH & Co., Germany) with a mean particle size of 0.3 µm and 0.9 µm, respectively, and purities equal to or higher than 95%, respectively, are employed as sintering additives. 3680 mg of silicon carbide, 80 mg of aluminium oxide (2 wt %) and 200 mg of yttrium oxide (5 wt %) are attrition milled for 2 h in 150 ml of ethanol containing 70 g of silicon nitride balls to avoid contamination. The ethanol of dispersed slurry is removed using a rotary-evaporator at 90° C. for 2 h, and the ceramic paste is dried in an oven at 120° C. for 6 h. The dried paste is sieved through a 63 µm mesh.

A 20 mm graphite die is filled with 3 g of the ceramic powder mixture and placed in the spark plasma sintering equipment (Dr. Sinter, SPS-510CE, Japan). The sintering test is carried out at 1850° C. for 5 min, in 4 Pa vacuum, and applying a uniaxial pressure of 50 MPa. Heating rate is 133° C.·min$^{-1}$ up to 1400° C., 100° C.·min$^{-1}$ from 1400° C. to 1600° C., 65° C.·min$^{-1}$ from 1600° C. to 1730° C., 45° C.·min$^{-1}$ from 1730° C. to 1820° C., 30° C.·min$^{-1}$ from 1820° C. to 1850° C. Pulsed direct current of about 5.3 volts and about 2200 amperes are used.

The AC electrical conductivity is measured at room temperature by impedance spectroscopy (Potentiostat/galvanostat Autolab PGstat 302N) in the 10 Hz–1 MHz frequency range on samples of 7 mm×3 mm×2.5 mm. An AC electrical conductivity of 935 S·m$^{-1}$) is recorded.

We claim:

1. A method for manufacturing in situ graphene containing silicon carbide matrix ceramic composites, the method comprising:
   a) mixing a ceramic powder composition consisting of silicon carbide and at least one sintering additive;
   b) densifying the ceramic powder composition by electric current activated/assisted sintering (ECAS), resulting in graphene growth from thermal decomposition of silicon carbide within a ceramic material from the ceramic powder composition.

2. The method according to claim 1, wherein said silicon carbide is a silicon carbide powder comprising one or more types of silicon carbide selected from the group consisting of alpha-phase silicon carbide and beta-phase silicon carbide.

3. The method according to claim 2, wherein said silicon carbide powder has an average particle size between 0.05 µm and 10.0 µm.

4. The method according to claim 1, wherein said at least one sintering additive comprises at least one member of the group consisting of metallic oxides and mixtures of metallic oxides and non-metallic oxides.

5. The method according to claim 4, wherein said sintering additive is selected from the group consisting of aluminum oxide, silicon dioxide, aluminum nitrate, yttrium nitrate, yttrium oxide, lutetium oxide, ytterbium oxide, gadolinium oxide and lanthanum oxide.

6. The method according to claim 1, wherein said sintering additive comprises aluminium oxide powder and yttrium oxide powder, and wherein the sintering additive constitutes more than 0% and up to 21% of said ceramic powder composition by weight.

7. The method according to claim 6, wherein said ceramic powder composition comprises 2 weight % of aluminium oxide and 5 weight % of yttrium oxide.

8. The method according to claim 1, wherein said graphene comprises at least one of monolayer, 2 to 20 layer, and multilayer graphene, or combinations thereof.

9. The method according to claim 1, wherein said electric current activated/assisted sintering (ECAS) technique is selected from the group consisting of resistance sintering (RS), electric discharge sintering (EDS), spark plasma sintering (SPS), field activated sintering technique (FAST), pulsed electric current sintering (PECS), pulse discharge sintering (PDS), plasma activated sintering (PAS), and pulse current sintering (PCS).

10. The method according to claim 1, wherein said densification of the ceramic powder composition and graphene growth are effected through application of a vacuum atmosphere between 10 Pa and 0.1 Pa.

11. The method according to claim 1, wherein said densification of the ceramic powder composition and graphene growth are effected under uniaxial pressure between 20 MPa and 100 MPa.

12. The method according to claim 1, wherein said densification of the ceramic powder composition and graphene growth are conducted at maximum temperatures between 1600° C. and 2000° C.

13. The method according to claim 1, wherein densification of the ceramic powder composition and graphene growth are conducted at a holding time of between 0 and 30 minutes at a maximum temperature.

14. The method according to claim 1, wherein the densification of the ceramic powder composition and graphene growth includes application of heating rate ramps as a function of a maximum temperature, Tmax, selected from the group consisting of a) 133° C.·min$^{-1}$ up to 1400° C.; b) from 1400° C. to Tmax−75° C. at 75° C.·min$^{-1}$; c) from Tmax−75° C. to Tmax−25° C. at 50° C.·min$^{-1}$; and d) from Tmax−25° C. to Tmax at 25° C.·min$^{-1}$.

\* \* \* \* \*